Patented Nov. 17, 1953

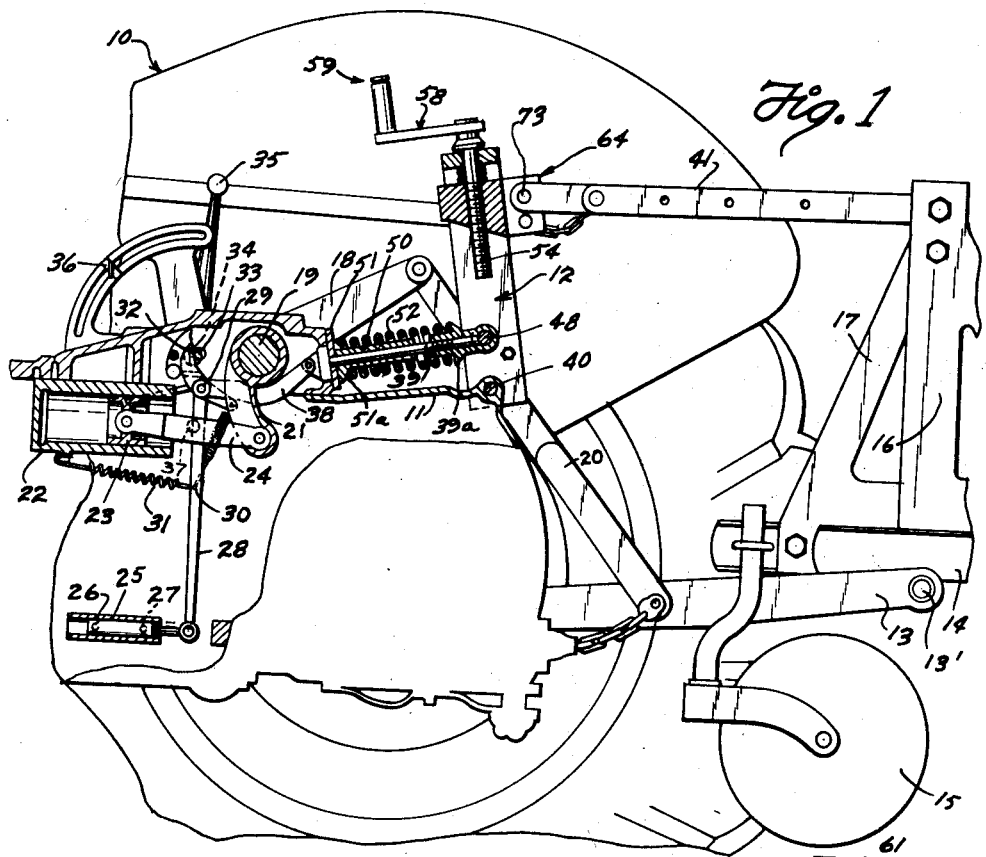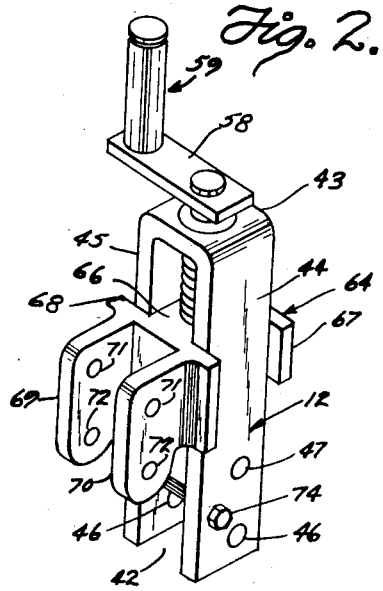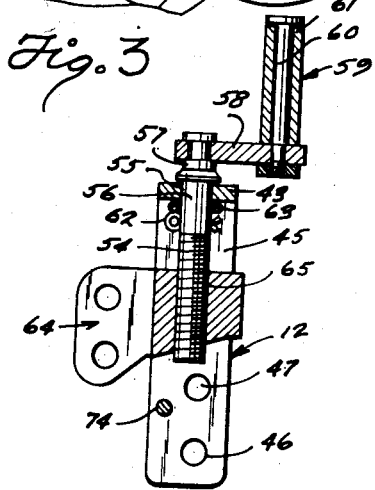

2,659,286

UNITED STATES PATENT OFFICE 2,659,286

DRAFT EQUALIZER FOR TRACTOR IMPLEMENT HITCHES

Henry Metzger, Mercedes, Tex.

Application October 24, 1949, Serial No. 123,215

5 Claims. (Cl. 97—46.07)

My invention relates to a draft of implement and weight of implement equalizer arm which is adapted to be used with and improve the working qualities of the Ford and Ferguson tractor attachment systems.

The Ford and Ferguson tractor attachment systems provide for carrying the implement as a unit on the tractor and the principle of such a system is disclosed in prior patents to Ferguson Numbers 1,687,719, 2,118,181 and Reissue 22,642. In this system it is usual to employ a three point suspension for the implement wherein two lower links pivotally support and lift the implement in conjunction with a third and upper link which also serves as the pressure control link or compression link for transmitting control forces from the implement to the control rod operating the hydraulic lift mechanism on the tractor. This control rod is biased by a heavy compression spring which is compressed in response to the forces in the compression or upper link of the three point implement suspension system.

In this system the forward end of the compression link or upper link of the three point suspension system is pivotally attached to a duplex crank pivoted to the tractor differential housing. Also pivotally attached to this duplex crank is the rear end of a sleeve provided with a collar to which is attached a control rod for the hydraulic lift mechanism for the three point suspension system. Interposed between the tractor housing and the collar on said sleeve, pivotally attached to the duplex link, is a compression or biasing spring which is compressed by the compression link acting through the duplex crank. The point of pivotal attachment is fixed for the rear end of the compression link on the duplex crank which is pivoted to the tractor differential housing. Thus, the length of the lever arm is fixed through which the forces act which forces are transmitted by the compression link from the soil engaging implement. The length of this arm is equal to the distance in the duplex crank from its pivotal attachment on the differential housing to the pivotal attachment of the forward end of the compression link.

It is a primary object of my invention to replace this duplex crank with a connecting means by which the operator of the tractor may vary, while the tractor is underway, the length of the arm through which acts the forces in the compression link. In order to accomplish this object it is necessary to provide a lever which is pivoted to the tractor housing; has a pivoted attachment for the rear end of the sleeve to which is connected the control rod for the hydraulic system and over which the compression spring is mounted; and a means for connecting the front end of the compression link which may be moved along this arm by the tractor operator so as to vary the length of the arm through which the forces of the compression link act to compress the compression spring and move the control rod associated with the compression spring for controlling the hydraulic lift system for the lift links of the three point implement suspension system.

I have found that in operation of the normally equipped tractor of the Ford and Ferguson type there is no way for the operator to control the implement such as a plow, planter, cultivator, disc, chisel and border machine from loping in and out of the ground as the soil varies from heavy black land to soft sandy land. Further, in the normally equipped tractor of this type to which my invention may be applied, there is no way for the operator to compensate for the difference in the various weights of implements. A heavy implement compresses the compression spring faster and thus moves the control rod much faster than a light implement. When an implement is, for example, plowing shallow and an obstruction or heavier type of soil is encountered, the compression spring is not compressed fast enough to render the proper control to the hydraulic system and the plow will either bury itself in the soil or it will completely leave the soil.

By using my means for adjusting the length of the arm through which the forces act from the compression link to compress the compression spring and thus move the control rod for the hydraulic system, a heavy implement may be made to run smoother and the skipping in and out of the ground of lightweight implements may be eliminated by merely adjusting the length of the arm to suit the conditions of weight of implement and the type of soil. This adjustment may be made by the operator while the tractor is in motion.

It is an object of my invention to provide a connecting arm of adjustable length between the forward end of the upper or compression link of a three point implement suspension system and the compression spring and control rod in a hydraulic control system for such an implement suspension.

It is a further object of my invention to provide an arm or lever which is pivoted at its lower end to a tractor, a pivotal attachment on this arm above this lower pivot end for attaching the rear end of the control rod and compression spring of an implement lift control system, and a connection movable along this arm for attaching the forward end of the upper or compression link in a three point implement suspension system for the tractor.

A still further object of my invention is to provide a lever for pivotal attachment to the differential housing of a Ford and Ferguson type of tractor which includes a pivoted connecting means above its lower pivotal end for attachment of the control rod and compression spring of the tractor's hydraulic implement lift control system and a means on the lever which may be moved by the operator of the tractor to a position closer to or further away from the lower pivotal end of the lever and to which is attached the forward end of the upper or compression link of the tractor's three point implement suspension system.

A still further object of my invention is to provide a U-shaped lever having pivotal means at its lower open end for attachment to a tractor, pivot means above this lower pivotal attachment to the tractor for attachment of the rear end of a control rod and compression spring in the hydraulic implement lift control system, a screw rod extending within the U-shaped arm and mounted for rotation within the closed end of the U-shaped arm, a handle for rotating the screw rod, a member slidably mounted on the U-shaped lever provided with screw threads for receiving the screw rod which when rotated moves the member along the screw rod and along the U-shaped lever, and means on the slidable member for pivotally attaching the forward end of the upper or compression link of a three point implement suspension system for a tractor.

For a more complete understanding of the nature and scope of my invention, reference can be had to the following detailed description taken in connection with the accompanying drawings in which:

Figure 1 is a side view partly in section showing the three point suspension system in a Ford and Ferguson type of tractor with the adjustable length arm incorporated according to my invention;

Figure 2 is a perspective view of my adjustable length connecting lever; and

Figure 3 is a cross-section side elevation of the adjustable length of lever of Figure 2.

Like characters refer to similar parts in the various figures.

In Figure 1 a tractor of the Ford or Ferguson type is indicated generally at 10 and has a differential housing shown in section at 11 to which is pivotally mounted the lower end of my adjustable length lever or arm generally indicated at 12. This adjustable length lever 12 replaces the normal duplex crank found in this type of tractor implement attachment and lift. In general the type of tractor to which my invention may be applied is shown in the above mentioned Ferguson patents. The construction and operation of the Ferguson system used on Ford and Ferguson tractors is well known to those skilled in the art and it will not, therefore, be necessary to describe it in complete detail.

Two lower draft links 13 are pivoted to housing 11 at their forward ends and are pivotally connected to an implement 14, at their rear ends 13'. The implement 14 here shown is a disc plow having discs as indicated at 15 and shown in an elevated position. Implement 14 is provided with a frame including a vertically extending part 16 supported by an angle support member 17. The draft links 13 are arranged to be moved vertically by power means comprising in this system a pair of lift arms 18 secured to the opposite ends of a rock shaft 19 extending transversely of the differential housing 11 and connected by links 20 with the draft links 13.

Within the differential housing the rock shaft carries a lever arm 21 through which the shaft is rocked to lift the arms by the hydraulic motor comprised of the cylinder 22 and piston 23, the piston and arm 21 being coupled by the connecting rod 24. Pressure fluid is supplied to the lift cylinder from a pump, not shown, the flow of fluid to and from the cylinder being controlled by the valve 25 adapted to control an inlet port 26 and outlet port 27 and which is connected to a lever 28 of duplex form which is pivoted at 29, engaged at 30 by the tension spring 31 and has its top end 32 normally kept by said spring against the eccentric or cranked part 33 of the shaft shown in broken outline at 34 on which is mounted the manual control lever 35. Since the pivot 29 and crank 33 are movable, the lever 28 may be termed a "floating lever." An adjustable stop 36 is provided to determine the maximum depth of depression of the implement. The lever 28 also has two inward projections 37, shown in broken circle outline, which can act as fulcrum means and the pivot 29 is provided on a reciprocable stirrup 38 pivotally attached to a composite rod 39 and sleeve 39a pivotally attached to adjustable length lever 12 which is pivoted at 40 on the tractor housing 11 and has connected thereto the upper or compression link 41.

In Figure 1 the mechanism is shown for a raised position of the implement 14, there being no compression forces acting in the link 41 attached at its forward end to the lever 12. The valve 25 covers both ports 26 and 27 so that there is no movement of oil. In order to lower the implement to working position the manual lever 35 is moved to engage the stop 36 which has been adjusted to a position corresponding to the depth of cut required.

The adjustable length lever 12, see Figures 2 and 3, is made of heavy metal strap material and is bent into a U-shape having an open lower end at 42 and an upper closed end at 43. Toward the open end 42 the sides or legs 44 and 45 of the lever 12 are apertured at 46—46 to receive the pivot mounting pin 40 which pivotally connects the lower end of the lever to the housing 11. Slightly above the pivot apertures 46—46 are apertures 47—47 for receiving a pivot pin 48 which pivotally connects the rear end of composite rod 39 and sleeve 39a to lever 12. Surrounding composite pin 39, see Figure 1, is a collar 50 abutting at its forward end against a plate 51 which rides against housing 11. Surrounding the composite pin 39 and collar 50 is a balance or compression spring 52 which abutts at its forward end against a ridge 51a formed on collar 50 and at its rear end it abutts against a shoulder formed on sleeve 39a. Compression forces acting through upper link 41 are applied through lever 12 to compress the compression control spring 52 and move the composite or control rod 39 connected at its forward end to the linkage actuating the fluid pressure lift mechanism for the implement.

The means by which the operator of the tractor may adjust the length of the lever arm 12 through which compression forces in lever 41 act in compressing spring 52 will now be described. A screw rod 54, see Figure 3, is mounted for rotation in an aperture 55 formed in the upper end 43 of lever 12. The screw rod has a journal portion at 56 which rotates in aperture 55 and is formed with a collar 57 at its upper end to which is rigidly fixed a transversely extending crank 58. Crank 58 has a handle 59 secured at its outer end which comprises a post 60 and a rotary collar 61 which may be grasped by the hand of the tractor operator from his normal operating position on the tractor. Screw rod 54 is held in lever 12 by a cotter pin 62 which passes through a suitable transversely extending aperture in the rod. Above the cotter pin 62 there may be placed a washer as indicated at 63.

A slidable member generally indicated at 64 is mounted between the legs 44 and 45 of the lever 12 and is apertured and threaded at 65 to receive the screw rod 54 which when rotated by crank 58 moves member 64 along the lever 12. Slide member 64 is formed with a central portion 66 through which extends the threaded aperture 65. The central portion 66 is a block of rectangular shape and slides against the inner adjacent faces of leg members 44 and 45. Formed on the central member 66 are oppositely disposed parallel shoulders 67 and 68 which extend slightly beyond the legs 44 and 45 of lever 12 and have a sliding fit with the adjacent edges of these legs 44 and 45, as best shown in Figure 2. Two spaced and parallel lugs 69 and 70 are formed to extend from and transversely to shoulder 68. Between these spaced lugs 69 and 70 is received the forward end of compression or upper link 41, see Figure 1. Two pair of suitable apertures 71—71 and 72—72 are formed in the lugs 69 and 70 to receive a pivot pin 73, see Figure 1, which pivotally secures the forward end of link 41 to the slide 64 on lever 12. In assembling the slide member 64, a through belt 74 secured toward the ends of the legs 44 and 45 is removed and the member 64 is slid into the open end 42 of the lever 12 and screw rod 54 is threaded into the central body 66. Bolt 64 when in place prevents slide 64 from being removed from the lever.

In operation forces acting in upper or compression link 41 are applied to the lever 12 towards its upper end as shown by the position of the slide 64 in Figure 1. This, for example, gives a working arm of a length substantially equal to the distance between pivot 73 and pivot 40, see Figure 1. Thus, if a lightweight implement is being used and the slide 64 is in its uppermost position, the forces developed through the implement act through a maximum length of lever arm extending from pivot 73 to pivot 40. This permits a greater leverage in arm 12 which acts to compress spring 52 attached to lever 12 at pivot 48 just above pivot 40.

If a heavy implement is being used it may not be necessary to use the long leverage arm and thus the operator turns crank 58 to move slide member 64 downward, thereby decreasing the length of the leverage arm 12, that is the distance between pivots 73 and 40.

The action of lever 12 with its adjustable length of arm is equivalent to changing spring 52 from a heavy spring, one that is hard to compress, to a light spring, that is one that is easy to compress.

The action of the adjustable length lever 12 is superimposed on the regular hydraulic control for operating the suspension of the implement. Control rod 39 within spring 52 is moved by lever 12 to actuate the regular linkage controlling valve 25 and thence power piston 23 for the lift linkage.

While the tractor is in motion the operator can easily turn crank 59 to adjust the length lever arm 12. Thus, as the soil being worked varies, for example, from a heavy black to a soft sand soil, the operator can adjust the length of arm 21 to compensate for such variation, thereby preventing the implement from loping in and out of the ground.

Since it is obvious that certain further changes can be made in the foregoing constructions without departing from the spirit and scope of this invention, it is intended that all matter shown in the accompanying drawings or described hereinbefore shall be interpreted as illustrative and not in a limiting sense.

I claim as my invention:

1. Hitch means for connecting an implement to a tractor vehicle comprising upper and lower link means subject to compressive and tensile stresses in resisting turning movement of the implement due to the draft thereon, the upper of said link means being connected to said tractor through a variable length lever extending substantially vertically transverse to said upper link means, said variable length lever comprising a first member pivoted at its lower end to said tractor and having means positioned above said lower pivoted end for attaching a control rod and compression spring for a lift means for said hitch, a second member movably positioned along said first member from and toward said lower pivoted end of the first member, and screw means for moving said second member along said first member, said second member being pivotally connected to the forward end of said upper link means, whereby the effect of the force applied by said upper link to the control rod and compression spring for the lift means for said hitch may be varied upon changing the position of said second member along said first member.

2. In an automatic depth control for ground working implements of the type in which a link and control rod are moved by forces resulting from an implement working in the ground to operate mechanism attached to a tractor for controlling the depth of the implement in the ground and a spring is used to resist said forces and effect such depth control, means for adjustably coupling said link to said control rod whereby the forces in said link act through said adjustable coupling against said spring, said coupling means comprising a lever pivotally attached at its lower end to said tractor, pivotal connecting means above said lower pivotal end on the lever for said control rod, a member adjustably positioned along said lever for attachment of said link, and screw means attached to said lever and said member for adjustably positioning said member along said lever, whereby movement of said member toward said lower pivotal mounting of the lever decreases the leverage arm through which said link acts on said spring in moving said control rod and movement of said member away from said lower pivotal mounting of the lever increases the leverage arm through which said link acts on said spring in moving said control rod.

3. A device of the character described for varying the position of application of the forces in a compression link for actuating a compression spring and a control rod of a hydraulic implement lift system for a tractor, comprising a lever pivotally mounted at its lower end to said tractor, means for connecting one end of said control rod and compression spring to said lever at a point above said tractor pivotal connection, a slide member movable along said lever for connecting said compression link with said lever, and screw means attached to said lever and said member for moving said member along said lever, whereby the effective length of said lever may be varied by moving said slide member along said lever.

4. Hitch means for connecting an implement to a tractor vehicle comprising upper and lower link means subject to compressive and tensile stresses in resisting turning movement of the implement due to the draft thereon, the upper of said link means being connected to said tractor through a variable length lever extending substantially vertically transverse to said upper link means; said variable length lever comprising a first member pivoted at its lower end to said tractor and having means positioned above said lower pivoted end for attaching a control rod and compression spring for a lift means for said hitch; said first member of the variable length lever being of a U-shape open at its lower pivotal connecting end and closed at its upper end; a second member movably positioned along said first member from and toward said lower pivoted end of the first member; said second member comprising a block slidable within said U-shaped first member having flanges for guiding it in said U-shaped member and means for pivotally connecting said upper link of the implement hitch means; and means for moving said second member along said first member, whereby the effect of the force applied by said upper link through said variable length lever to said control rod and compression spring for the lift means for said hitch may be varied.

5. Hitch means for connecting an implement to a tractor vehicle comprising upper and lower link means subject to compressive and tensile stresses in resisting turning movement of the implement due to the draft thereon, the upper of said link means being connected to said tractor through a variable length lever extending substantially vertically transverse to said upper link means, said variable length lever comprising a first member pivoted at its lower end to said tractor and having means positioned above said lower pivoted end for attaching a control rod and compression spring for a lift means for said hitch, a second member movably positioned along said first member from and toward said lower pivoted end of the first member, and means for moving said second member along said first member, said second member being pivotally connected to the forward end of said upper link means, whereby the effect of the force applied by said upper link to the control rod and compression spring for the lift means for said hitch may be varied; said first member of the variable length lever being of a U-shape open at its lower end and provided at its upper closed end with a rotary mounting for said means for moving a rotary mounting for said means for moving said second member along said first member; said second member comprising a block slidable within said U-shaped first member having flanges for guiding it in said U-shaped member, a threaded aperture extending through said block for mounting said means for moving said second member along said first member, and a pair of spaced extending lugs for receiving and pivotally connecting with the forward end of said upper link; said means for moving said second member along said first member comprising a shaft mounted for rotation in said rotary mounting in the upper end of said first member, a threaded portion on said shaft threadedly received in said threaded aperture in the second member and a crank fixed to said shaft whereby rotation of said crank rotates said shaft to move said second member threadedly engaged therewith.

HENRY METZGER.

References Cited in the file of this patent
UNITED STATES PATENTS

| Number | Name | Date |
|---|---|---|
| 2,456,693 | Fraga | Dec. 21, 1948 |
| 2,460,847 | Schwarz | Feb. 8, 1949 |
| 2,462,588 | Wondra | Feb. 22, 1949 |
| 2,465,641 | Gardner | Mar. 29, 1949 |
| 2,515,637 | Dooley et al. | July 18, 1950 |

FOREIGN PATENTS

| Number | Country | Date |
|---|---|---|
| 520,484 | Great Britain | Apr. 25, 1940 |